US010547598B2

(12) United States Patent
Cates et al.

(10) Patent No.: US 10,547,598 B2
(45) Date of Patent: Jan. 28, 2020

(54) ABSTRACTED CRYPTOGRAPHIC MATERIAL MANAGEMENT ACROSS MULTIPLE SERVICE PROVIDERS

(71) Applicant: Vormetric, Inc., San Jose, CA (US)

(72) Inventors: Solomon Cates, San Jose, CA (US); Richard Kettlewell, San Jose, CA (US); Nicholas Smith, San Jose, CA (US)

(73) Assignee: THALES ESECURITY, INC., Plantation, FL (US)

( * ) Notice: Subject to any disclaimer, the term of this patent is extended or adjusted under 35 U.S.C. 154(b) by 215 days.

(21) Appl. No.: 15/472,065

(22) Filed: Mar. 28, 2017

(65) Prior Publication Data

US 2018/0234401 A1    Aug. 16, 2018

Related U.S. Application Data

(60) Provisional application No. 62/458,269, filed on Feb. 13, 2017.

(51) Int. Cl.
*H04L 29/06* (2006.01)
*H04L 9/08* (2006.01)

(52) U.S. Cl.
CPC ............ *H04L 63/06* (2013.01); *H04L 9/0822* (2013.01); *H04L 9/0861* (2013.01); *H04L 9/0894* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,195,751 B1 * | 2/2001 | Caronni | ................ | H04L 12/185 713/162 |
| 6,553,493 B1 * | 4/2003 | Okumura | .............. | H04L 9/0897 713/168 |
| 7,590,844 B1 * | 9/2009 | Sherman | ............... | H04L 9/3271 380/255 |
| 8,190,675 B2 * | 5/2012 | Tribbett | .................. | G06F 9/541 709/203 |
| 9,864,874 B1 * | 1/2018 | Shanbhag | ........... | G06F 21/6218 |
| 2004/0123104 A1 * | 6/2004 | Boyen | .................. | G06F 21/602 713/165 |
| 2008/0123855 A1 * | 5/2008 | Thomas | .................. | H04L 9/083 380/277 |

(Continued)

*Primary Examiner* — Malcolm Cribbs
(74) *Attorney, Agent, or Firm* — Womble Bond Dickinson (US) LLP

(57) ABSTRACT

A method for cryptographic material management is provided. The method includes receiving into a computing device, through an API of the computing device, a designation of which of a plurality of key-producing cloud services sources each of a plurality of keys and which of a plurality of key-consuming cloud service providers uses each of the plurality of keys for encrypting or decrypting data. The method includes directing, from the computing device through a first plurality of end modules each interfaced to a specific API of a specific one of the plurality of key-producing cloud services, production of one or more of the plurality of keys. The method includes directing, from the computing device through a second plurality of end modules each interfaced to a specific API of a specific one of the plurality of key-consuming cloud service providers usage of one or more of the plurality of keys.

16 Claims, 7 Drawing Sheets

(56) References Cited

U.S. PATENT DOCUMENTS

| | | | |
|---|---|---|---|
| 2011/0038482 A1* | 2/2011 | Singh | H04L 63/06 380/279 |
| 2014/0122875 A1* | 5/2014 | Pizi | G06F 21/33 713/164 |
| 2014/0297535 A1* | 10/2014 | Pinsker | G06Q 20/042 705/45 |
| 2015/0180656 A1* | 6/2015 | Rich | H04L 9/083 713/168 |
| 2016/0212109 A1* | 7/2016 | Hird | H04L 63/062 |
| 2018/0114278 A1* | 4/2018 | P B | G06Q 30/0201 |
| 2018/0176268 A1* | 6/2018 | Malatesha | G06F 3/0481 |
| 2018/0225732 A1* | 8/2018 | Doshi | G06Q 30/06 |

* cited by examiner

ABSTRACTED CRYPTOGRAPHIC MATERIAL MANAGEMENT ACROSS MULTIPLE SERVICE PROVIDERS

BACKGROUND

Cloud service providers offer cloud storage for data, encryption and decryption services, key production services, and even key management services. Usually, each of these services has an application programming interface (API) specific to that service. This situation burdens the user with the responsibility of learning each of these APIs and interacting with multiple service providers, with overhead for each addition of or change to a service, and each change in user needs. Key management services, while addressing and alleviating some of this burden, still have APIs unique to different key management service providers. It is within this context that the embodiments arise.

SUMMARY

In some embodiments, a processor-based method for cryptographic material management is provided. The method includes receiving into a computing device, through an application programming interface (API) of the computing device, a designation of which of a plurality of key-producing cloud services or key-producing platforms sources each of a plurality of keys and which of a plurality of key-consuming cloud service providers or key-consuming platforms uses each of the plurality of keys for encrypting or decrypting data. The method includes directing, from the computing device through a first plurality of end modules each interfaced to a specific API of a specific one of the plurality of key-producing cloud services or key-producing platforms, production of one or more of the plurality of keys. The method includes directing, from the computing device through a second plurality of end modules each interfaced to a specific API of a specific one of the plurality of key-consuming cloud service providers or key-consuming platforms, usage of one or more of the plurality of keys. In some embodiments, the method is captured on a computer readable medium.

In some embodiments, a cryptographic material management system is provided. The system includes a server, having physical computing resources or virtualized using physical computing resources, configurable to present an application programming interface (API) that supports user designation of which of a plurality of key-producing cloud services or key-producing platforms generates each of a plurality of keys and which of a plurality of key-consuming cloud service providers or key-consuming platforms uses each of the plurality of keys for encrypting or decrypting data. In some embodiments, one form of encrypting/decrypting data may include signature and verification. It should be appreciated that the key producing services may also be run on premise as the service is not limited to a cloud based service. The server includes a first plurality of end modules each configurable to interface to a specific API of a specific one of the plurality of key-producing cloud services or key-producing platforms to direct production of one or more of the plurality of keys. The server includes a second plurality of end modules each configurable to interface to a specific API of a specific one of the plurality of key-consuming cloud service providers or key-consuming platforms to direct usage of one or more of the plurality of keys.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A cryptographic material management system described herein manages cryptographic material across multiple service providers and platforms. The system provides cloud key management capabilities, among other capabilities. While some embodiments refer to a cloud based key producing service, this is not meant to be limiting as the key producing service may also be run on premise. A server presents an application programming interface (API) to a client device or user, and interfaces to various APIs of cloud service providers and platforms through end modules specific to the APIs. The server manages authentication, naming, policies and cryptographic key handling including key wrapping and transfers, across the service providers and platforms as directed by the client device or user. It should be appreciated that this frees up the user from having to learn all of the APIs of all of the cloud service providers and platforms, so that the user can make selections and give directions for key production and key usage through the API of the server. Customers of service providers can thus provision and control cryptographic material across multiple providers to maintain control of what data, services, and material is utilized in the infrastructure of each service, through a common interface. No modification is required of cryptographic service providers, and the system accommodates each provider individually.

Figure 1:
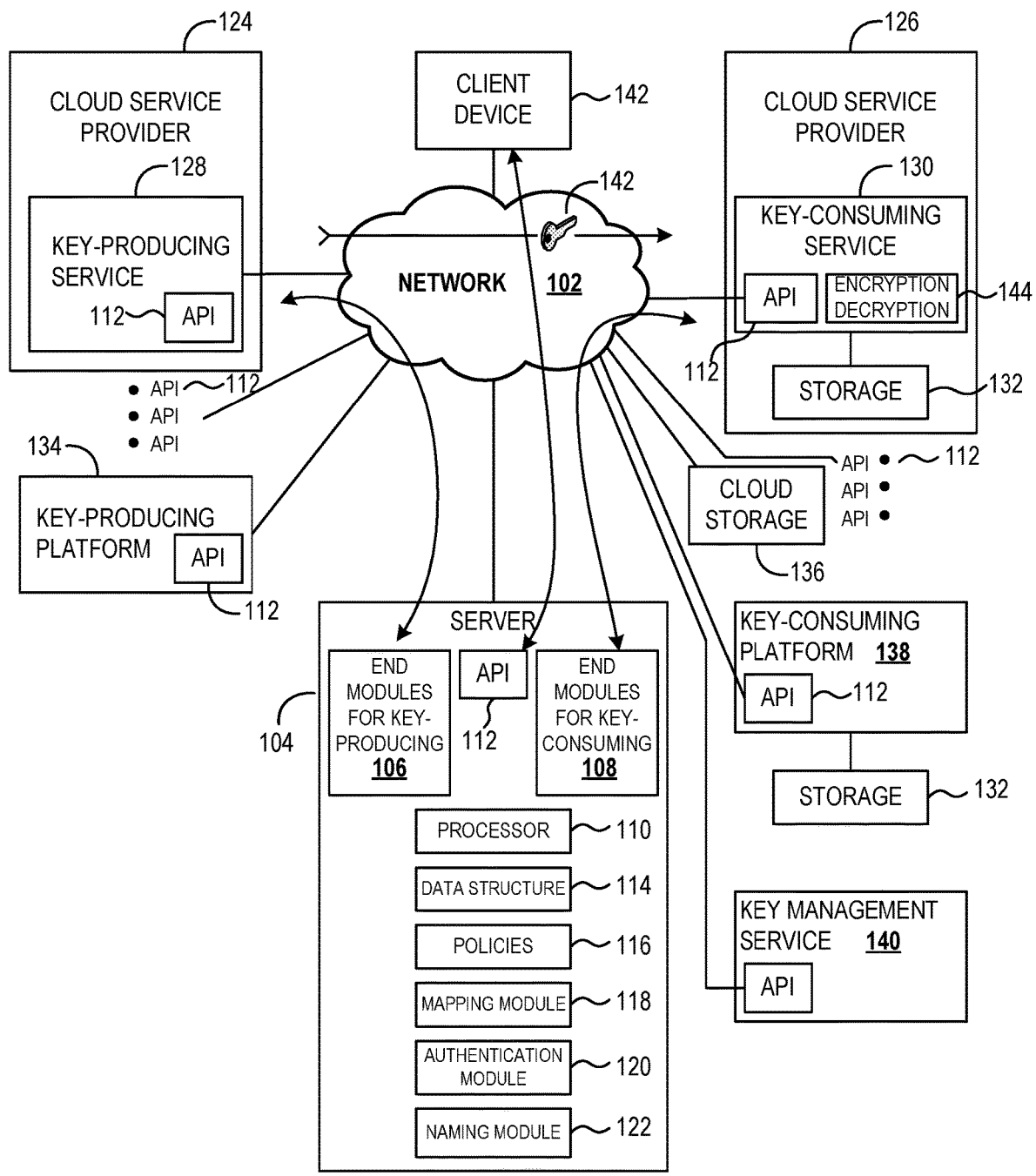
FIG. 1 is a system diagram of a cryptographic material management system that interfaces to application programming interfaces (APIs) of key-producing cloud services, key-producing platforms, key-consuming cloud services and/or key-consuming platforms in accordance with some embodiments.

FIG. 1 is a system diagram of a cryptographic material management system that interfaces to application programming interfaces (APIs) 112 of key-producing cloud services, key-producing platforms 134, key-consuming cloud services 130 and/or key-consuming platforms 138. Cryptographic keys 142 and encrypted data are managed as cryptographic material. To use the system for managing cryptographic material, a user accesses an API 112 of the server 104, for example through a client device 142 coupled to a network 102 such as the global communication network known as the Internet and depicted in FIG. 1 as a cloud. Through the API 112 of the server 104, the user (or client device 142) makes various selections or entries (see FIG. 3C example API) for sources of keys, usage of keys, encryption, decryption and storage of data, all through the common interface provided by the server 104.

Still referring to FIG. 1, various end modules 106 in the server 104, for key-producing, interface to APIs 112 of key-producing services 128 in cloud service providers 124 and/or APIs 112 of key-producing platforms 134 that are coupled to the network 102. Through these end modules 106 for key-producing, the server directs the key-producing services 128 and/or key-producing platforms 134 to generate or otherwise produce keys 142. Various end modules 108 in the server 104, for key-consuming, interface to APIs 112 of key-consuming services 130 in cloud service providers 126 and/or APIs 112 of key-consuming platforms 138 that are coupled to the network 102. The server directs usage of keys by the key-consuming services 130 and/or key-consuming platforms 138 through these end modules 108 for key-consuming.

In the server 104 of FIG. 1, a data structure 114, policies 116, a mapping module 118, an authentication module 120 and a naming module 122 are used for various functions in the management of cryptographic material, as described below in example scenarios. Each end module 106, 108, the mapping module 118, the authentication module 120 and the naming module 122 can be implemented in hardware, firmware, software executing on the processor 110 or combination thereof. The data structure 114 can be implemented in memory, or otherwise accessible by the processor, as can the policies 116. The server 104 can be implemented as a physical device or as a virtualized device using physical computing resources in some embodiments.

Continuing with FIG. 1, as one example scenario, the server 104 directs multiple key-producing services 128 and/or key-producing platforms 134 to generate multiple keys 142, and transfer the keys 142 to multiple key-consuming services 130 and/or key-consuming platforms 138. The server 104 directs these key-consuming services 130 and/or key-consuming platforms 138 to use the keys 142 for encryption and decryption 144 of data, which is directed to be stored in the storages 132 of the key-consuming services 130, storages 132 of key-consuming platforms 138 and/or cloud storage 136. To ensure that the production and usage of keys 142 and storage of data is as desired by the user, the server 104 accesses and consults various policies 116. For example, the policies 116 could specify which keys are produced by which providers or platforms and which keys are used by which providers or platforms, or could specify which keys can be used by which users, etc. To track keys and encrypted data, the server 104 uses the mapping module 118 to map keys and data to providers and platforms, storing the results of the mapping in the data structure 114. Keys are not required to be produced and used in a one-to-one relationship, and can be reused, shared, etc. Keys 142, various services, origins and destinations for keys and data, and other entities or actions, i.e., resources imported from services or platforms, may use existing names or be given or otherwise assigned names by the naming module 122. Providers, platforms and users are authenticated by the authentication module 122. In some versions, the server 104 authenticates to the providers and/or platforms.

As another example scenario with reference to FIG. 1, keys 142 can be managed by a key management service 140 through an API 112 in some embodiments. Keys 142 could be transferred directly from key-producing services 128 or key-producing platforms 134, to the key-consuming services 130 or key-consuming platforms 138. Or, keys could be transferred to a key management service 140 by the key-producing services 128 and key-producing platform 134, stored in the key management service 140, then deployed to the key-consuming services 130 and key-consuming platforms 138 on an as-needed basis. Instead, keys could be stored in the server 104, for example in the data structure 114 or elsewhere in memory. Alternatively, a key repository could be designated, or the keys could be stored in the client device 142. Further locations for storing keys are readily devised in keeping with the teachings herein.

It is possible a key-producing service 128 and key-consuming service 130 could be hosted by the same cloud service provider. It is also possible that key-producing platforms 134 (e.g., integrated circuits, circuit boards, boxes or other devices) or key-consuming platforms 138 (e.g., similar) could be local to the server 104, or remote from the server 104 but accessible through the network 102. Further scenarios with re-encryption, double encryption, decryption at one location and encryption at another location, encryption or decryption at the client device 142, encryption or decryption at the server 104, the key-producing service 128, key-producing platform 134, key-consuming service 130, key-consuming platform 138, cloud storage 136, key management service 140, etc., are envisioned and readily developed in keeping with the teachings herein.

Figure 2:
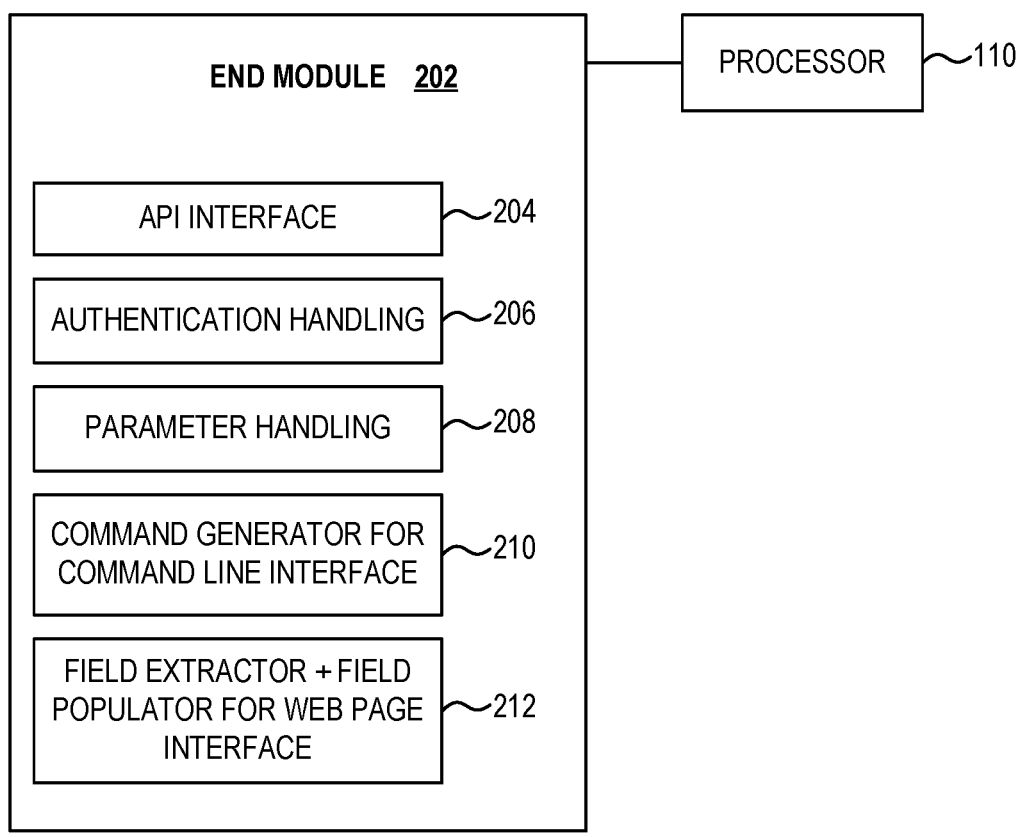
FIG. 2 is a block diagram of an end module suitable for use in the cryptographic material management system of FIG. 1 in accordance with some embodiments.

FIG. 2 is a block diagram of an end module 202 suitable for use in the cryptographic material management system of FIG. 1. For example, each of the end modules 106 for key-producing, and each of the end modules 108 for key-consuming could have some or all of the features, or be a variation, of the end module 202. Each end module 202 is specific to an API 112 of one of the services or platforms. Updates or upgrades to the cryptographic material management system could include new modules, for new services or platforms as these become available, and revisions to existing modules as services or platforms change.

In various embodiments, the end module 202 has an API interface 204 specific to an API 112, an authentication handling module 206, a parameter handling module 208, a command generator 210 for a command line interface, and/or a field extractor and field populator 212, for a web interface. The authentication handling module 206 directs authentication to, or authentication of, the service or platform represented by the API to which the API interface 204 couples. Parameters are extracted or inserted through the parameter handling module 208 into or out of the API of the service or platform. If the API of the service or platform has a command line interface, the command generator module 210 produces commands for the command line interface, in cooperation with the parameter handling module 208. If the API of the service or platform has a webpage interface, the field extractor and field populator module 212 extracts parameters from the webpage or populates parameters into the webpage (e.g., writes parameters to fields or makes selections in the webpage), through cooperation with the parameter handling module 208.

Figure 3A:
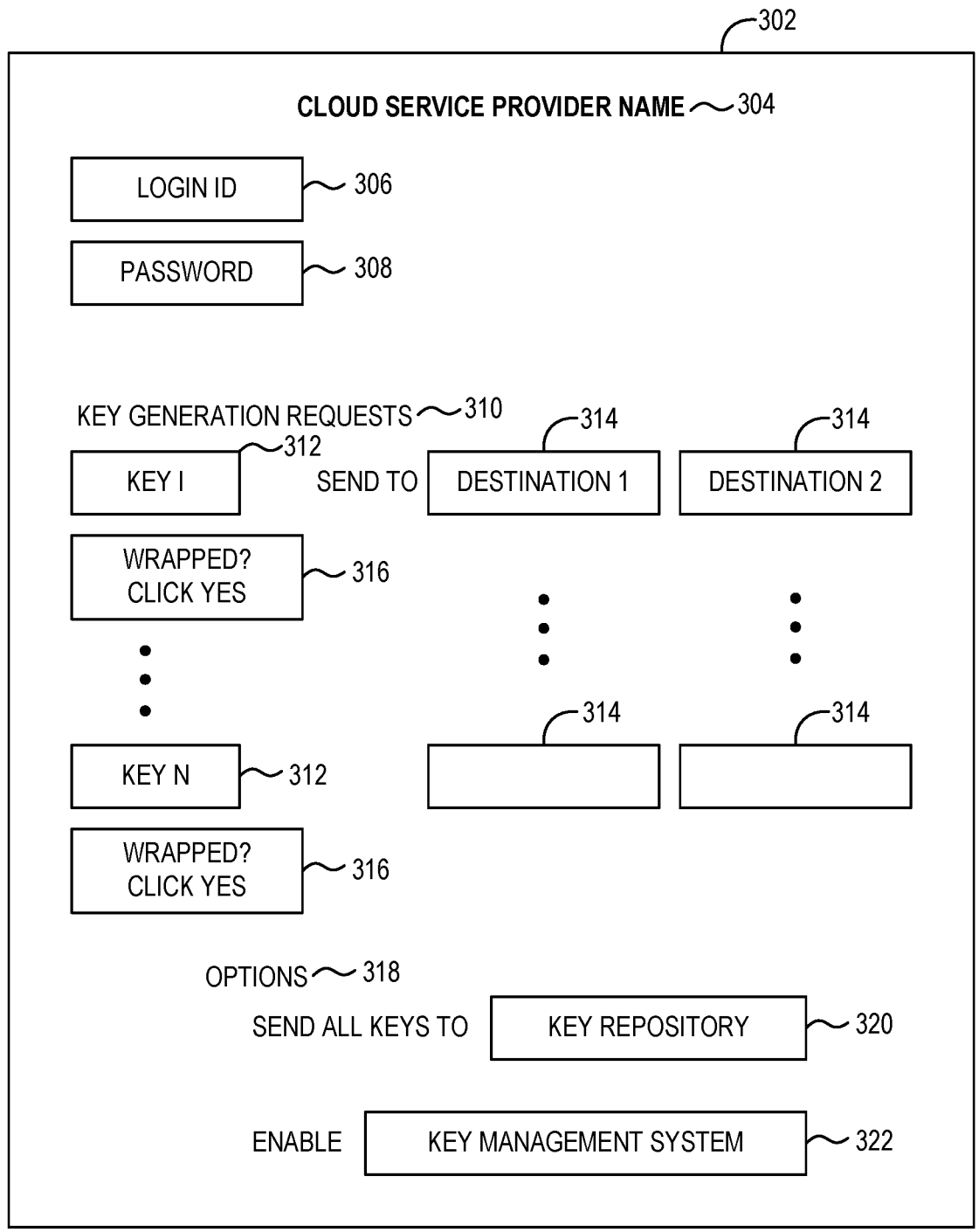
FIG. 3A is an example of an API of a key-producing cloud service in accordance with some embodiments.

FIG. 3A is an example of an API of a key-producing cloud service. This API is presented through a webpage 302 from a cloud service provider 124 that has a key-producing service 128. In the webpage 302, a title announces the cloud service provider name 304. For authentication, fields are shown in the webpage 302 for entry of logon ID 306 and password 308. Key generation requests 310 have fields for entry of a name 312, and one or more destinations 314 for the key. If it is desired the key be wrapped (e.g., encrypted by another key), a key wrapping selection 316 is made. Fields for key name 312, destination(s) 314 and key wrapping selection 316 are repeated for multiple keys. Options 318 are offered, such as to send all keys to a key repository 320, or to enable a key management system 322. Referring back to FIG. 1, in the server 104 an end module 106 for key-producing interfaces to the API presented by a cloud service through the webpage 302 of FIG. 3A. In a variation, the API could be presented through a command line interface, or could include a command line interface as part of the webpage 302. The above example could also serve for a key-producing platform 134. Further variations (e.g., with different menu styles, offerings, options, etc.) are readily devised.

Figure 3B:
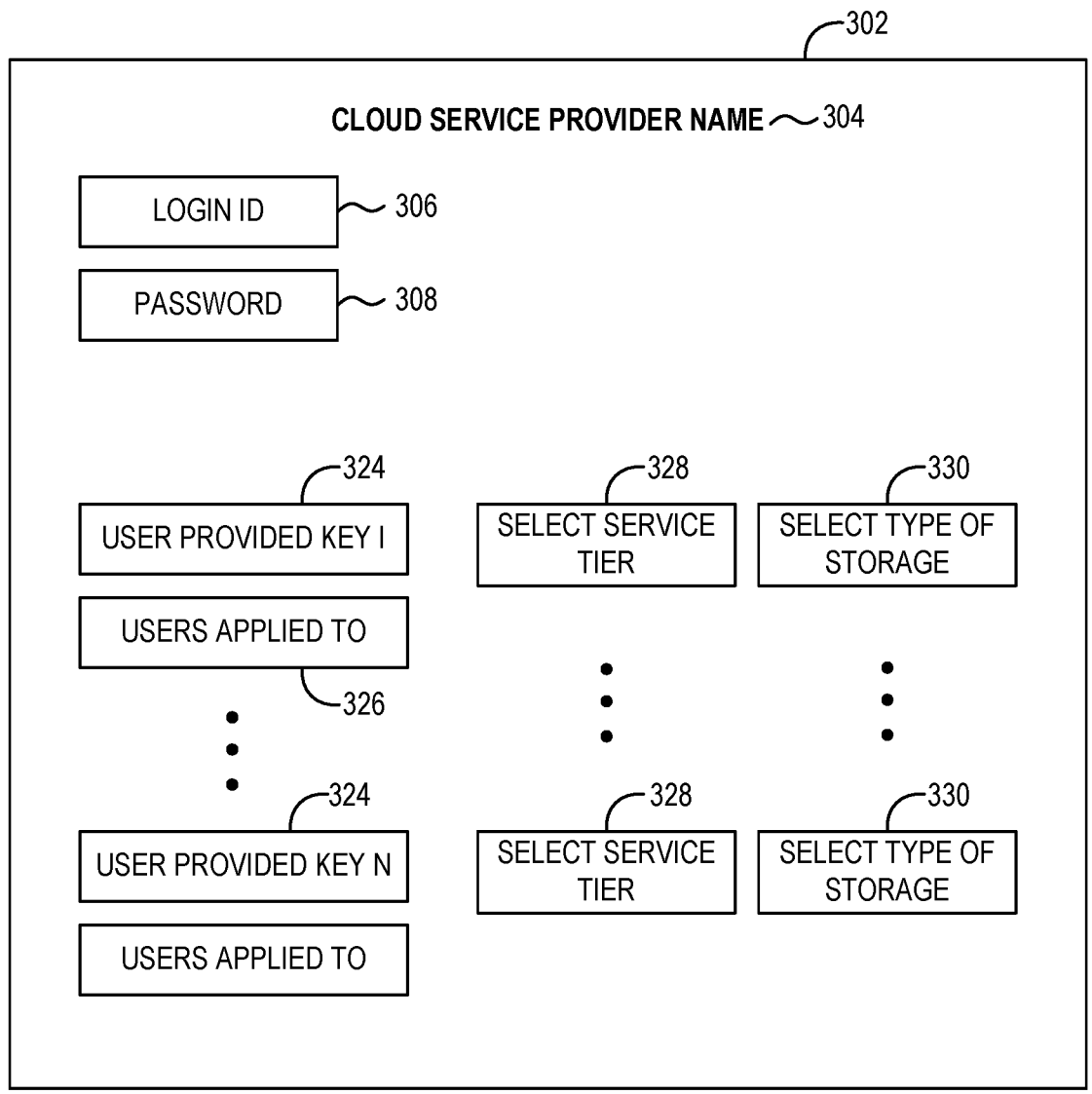
FIG. 3B is an example of an API of a key-consuming cloud service in accordance with some embodiments.

FIG. 3B is an example of an API of a key-consuming cloud service. Likewise, this API is presented through a webpage 302, but from a cloud service provider 124 that has a key-consuming service 130. Similarly, in this webpage 302, a title announces the cloud service provider name 304, and fields are available for entry of logon ID 306 and password 308. Fields are presented for providing a key 324, selecting a service tier 328, selecting a type of storage 330, and selecting or entering to which users the key and associated encryption/decryption are applied, for multiple keys and users. Other fields and options could be present in variations. Referring back to FIG. 1, in the server 104 an end module 108 for key-consuming interfaces to the API presented by a cloud service through the webpage 302 of FIG. 3B. The above example could also serve for a key-consuming platform 138.

Figure 3C:
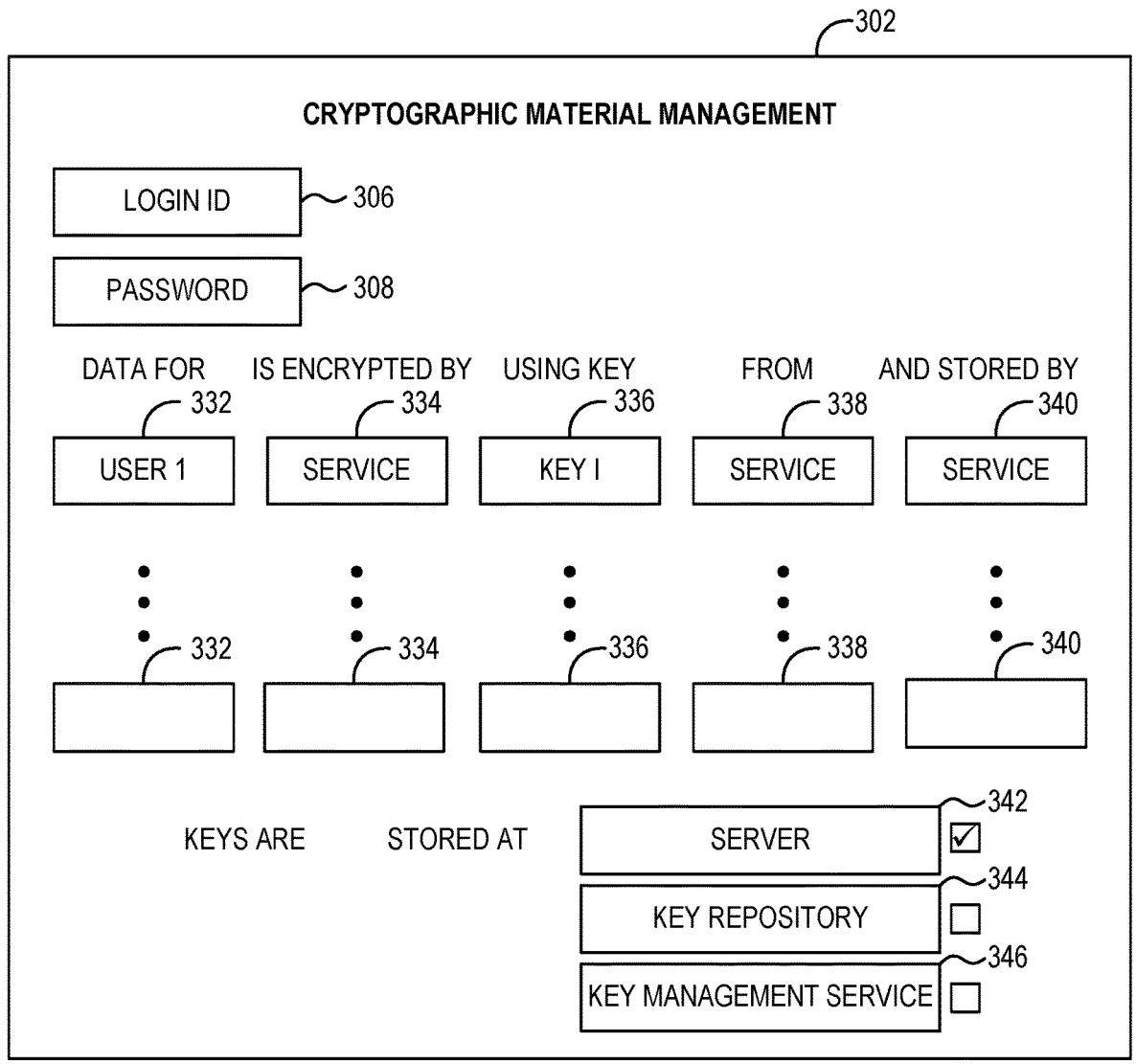
FIG. 3C is an example of an API for cryptographic material management through the cryptographic material management system of FIG. 1 in accordance with some embodiments.

FIG. 3C is an example of an API for cryptographic material management through the cryptographic material management system of FIG. 1. This API is seen, for example, by the client device 142 when coupled through the network 102 to the server 104 in order to manage cryptographic material in the system. Types of functions available through the API could include import key, grab key, map key, get key from, store key at, transfer key to, send key to, wrap key, name key, etc. The user or client device 142 logs onto the webpage 302 (i.e., authenticates to the server 104), by entering a logon ID 306 and password 308. By selecting or entering in fields for users 332, keys 336 and services 334, 338, 340, the user or client device 142 indicates that the data for selected users is encrypted by selected services using keys from selected services and stored by selected services. Key storage options are available, and the keys can be stored at the server 342, a key repository 344, or a key management service 346, as indicated at these fields. Variations on the above API are readily devised. In some versions, the policies 116 (see FIG. 1) are developed from information entered through the API, and in other versions the policies 116 are edited or uploaded separately.

Figure 4:
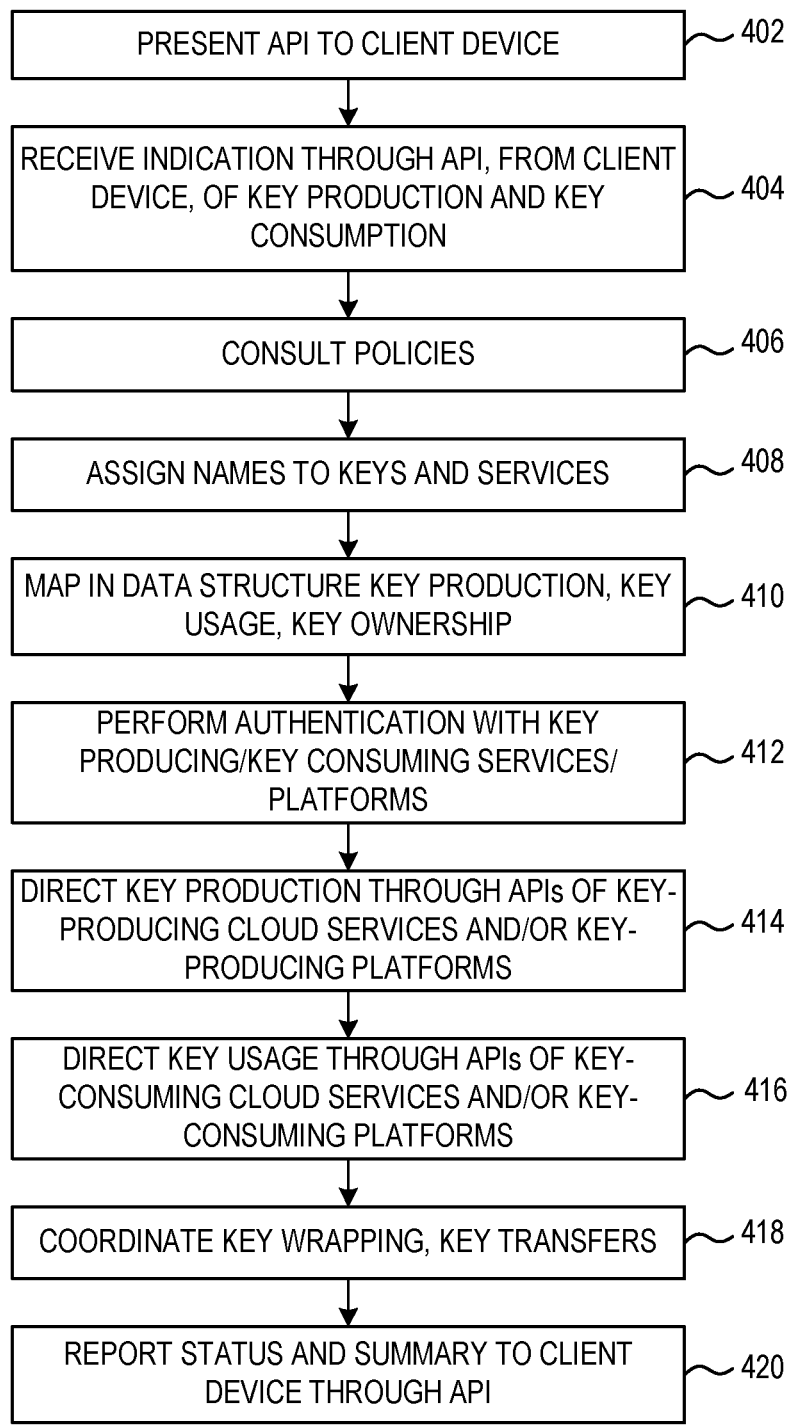
FIG. 4 is a flow diagram of a method of cryptographic material management, which can be practiced using the cryptographic material management system of FIG. 1, and variations thereof in accordance with some embodiments.

FIG. 4 is a flow diagram of a method of cryptographic material management, which can be practiced using the cryptographic material management system of FIG. 1, and variations thereof. The method can be practiced by a processor, more specifically by a processor of the server 104. The server presents an API to the client device, in an action 402. In an action 404, the server receives an indication through the API, from the client device, of key production and key consumption. For example, the client device, or more specifically the user through the client device, could make various selections in the webpage shown in FIG. 3C or variation thereof, to indicate, designate or direct how the cryptographic material is to be managed. In an action 406, policies are consulted. These policies, which are uploaded to the server or created interactively with the user or the client device, govern the cryptographic material management. In an action 408, names are assigned to keys and services. This could be done interactively with the user or client device, or automatically by the naming module of the server. In an action 410, key production, key usage and key ownership are mapped in a data structure, e.g., in or accessible by the server. In an action 412, authentication is performed with the key producing and key consuming services and platforms. The server 104 automates this process through respective end modules and APIs.

Still referring to FIG. 4, in an action 414, key production is directed through APIs of key-producing cloud services and or key-producing platforms. A suitable API is depicted in FIG. 3A. In an action 416, key usage is directed through APIs of key-consuming cloud services and/or key-consuming platforms. A suitable API is depicted in FIG. 3B. Key wrapping and key transfers are coordinated, in an action 418. The server directs key transfers and optional key wrapping through the various APIs, in accordance with user selection and/or policies. Status and summary are reported to the client device through the API, in an action 420.

Figure 5:
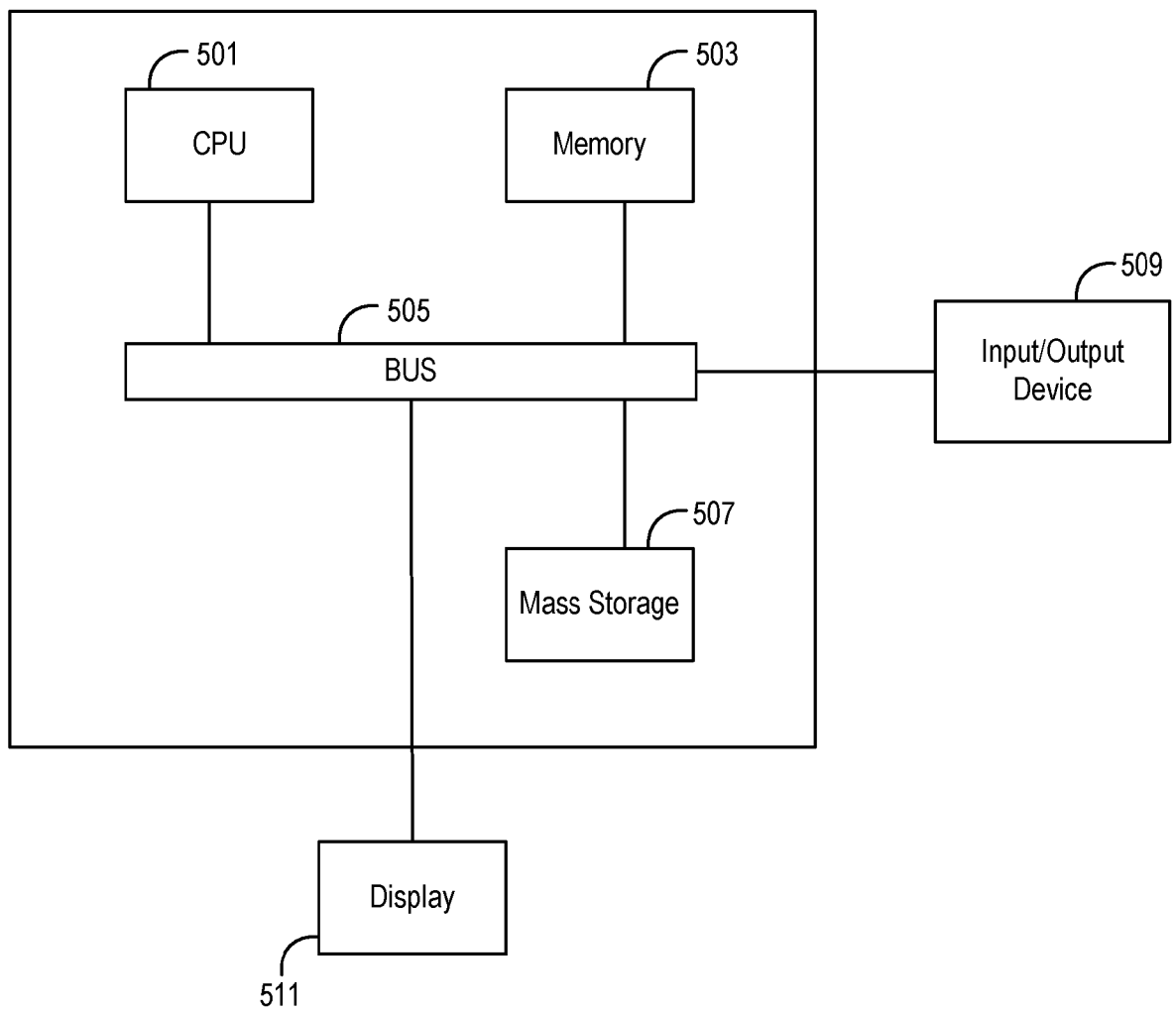
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for cryptographic material management in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be iOS™, MS-WINDOWS™, OS/2™, UNIX™, LINUX™, or other known operating systems. It should be appreciated that the embodiments described herein may also be integrated with a virtualized computing system that is implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A processor-based method for cryptographic material management, comprising:
    receiving into a computing device, through an application programming interface (API) of the computing device, a designation of which of a plurality of key-producing cloud services or key-producing platforms sources each of a plurality of keys and which of a plurality of key-consuming cloud service providers or key-consuming platforms uses each of the plurality of keys for encrypting or decrypting data;
    directing, from the computing device through a first plurality of end modules each interfaced to a specific API of a specific one of the plurality of key-producing cloud services or key-producing platforms, production of one or more of the plurality of keys;
    directing, from the computing device through a second plurality of end modules each interfaced to a specific API of a specific one of the plurality of key-consuming cloud service providers or key-consuming platforms, based on the received designation, usage of one or more of the plurality of keys;
    assigning names to resources imported from the plurality of key-producing cloud services or key-producing platforms and the plurality of key-producing cloud service providers or key-producing platforms to the API of the computing device; and,
    mapping, in a data structure in the computing device, key production, key usage and key ownership.

2. The method of claim 1, further comprising:
    coordinating, from the computing device, transfer of one of the plurality of keys from one of the plurality of key-producing cloud services or key-producing platforms to one of the plurality of key-consuming cloud service providers or key-consuming platforms, through corresponding end modules and APIs.

3. The method of claim 1, further comprising:
    coordinating, from the computing device, key wrapping among the plurality of key-producing cloud services or key-producing platforms.

4. The method of claim 1, further comprising:
    interfacing to an API of a key management service; and enforcing one or more policies through the key management service.

5. The method of claim 1, further comprising:
    managing, from the computing device, authentication for key production, key usage and key ownership.

6. A tangible, non-transitory, computer-readable media having instructions thereupon which, when executed by a processor, cause the processor to perform a method comprising:
    receiving into a computing device, through an application programming interface (API) of the computing device, an indication of which of a plurality of keys is produced by each of a plurality of key-producing cloud services or key-producing platforms and which of the plurality of keys is used by each of a plurality of key-consuming cloud service providers or key-consuming platforms to encrypt or decrypt data;
    directing, from the computing device through a first plurality of end modules each interfaced to a specific API of a specific one of the plurality of key-producing cloud services or key-producing platforms, based on the received indication, production of one or more of the plurality of keys in accordance with the received indication; and
    directing, from the computing device through a second plurality of end modules each interfaced to a specific API of a specific one of the plurality of key-consuming cloud service providers or key-consuming platforms, based on the received indication, usage of one or more of the plurality of keys in accordance with the received indication;
    assigning names to resources imported from the plurality of key-producing cloud services or key-producing platforms and the plurality of key-producing cloud service providers or key-producing platforms to the API of the computing device; and,
    mapping, in a data structure in the computing device, key production, key usage and key ownership.

7. The computer-readable media of claim 6, wherein the method further comprises:
    coordinating, from the computing device, transfer of at least a subset of the plurality of keys from one of the plurality of key-producing cloud services or key-producing platforms to at least a subset of the plurality of key-consuming cloud service providers or key-consuming platforms, through corresponding end modules and APIs.

8. The computer-readable media of claim 6, wherein the method further comprises:
    coordinating, from the computing device, key wrapping among the plurality of key-producing cloud services or key-producing platforms.

9. The computer-readable media of claim 6, wherein the method further comprises:
    interfacing to an API of a key management service; and enforcing one or more policies through the key management service.

10. The computer-readable media of claim 6, wherein the method further comprises:
   managing, from the computing device, authentication for key production, key usage and key ownership.

11. A cryptographic material management system, comprising:
   a server, having physical computing resources or virtualized using physical computing resources, configurable to present an application programming interface (API) that supports user designation of which of a plurality of key-producing cloud services or key-producing platforms generates each of a plurality of keys and which of a plurality of key-consuming cloud service providers or key-consuming platforms uses each of the plurality of keys for encrypting or decrypting data;
   the server having a first plurality of end modules each configurable to interface to a specific API of a specific one of the plurality of key-producing cloud services or key-producing platforms to direct, based on the user designation, production of one or more of the plurality of keys; and
   the server having a second plurality of end modules each configurable to interface to a specific API of a specific one of the plurality of key-consuming cloud service providers or key-consuming platforms to direct, based on the user designation, usage of one or more of the plurality of keys, the server having a data structure and configurable to map key production, key usage and key ownership in the data structure, and the server configurable to assign names to resources imported from the plurality of key-producing cloud services or key-producing platforms and the plurality of key-producing cloud service providers or key-producing platforms to the API of the server, the resources including at least one of keys, wrapped keys, key transfers, encryption services or cloud services.

12. The cryptographic material management system of claim 11, further comprising:
   the server configurable to coordinate transfer of at least one of the plurality of keys from one of the plurality of key-producing cloud services or key-producing platforms to at least one of the plurality of key-consuming cloud service providers or key-consuming platforms, through each corresponding API.

13. The cryptographic material management system of claim 11, further comprising:
   the server configurable to coordinate key wrapping among the plurality of key-producing cloud services or key-producing platforms.

14. The cryptographic material management system of claim 11, further comprising:
   the server configurable to represent the key production, key usage and key ownership through the API of the server in accordance with the data structure.

15. The cryptographic material management system of claim 11, further comprising:
   the server configurable to manage and consult a plurality of policies regarding key production, key usage and key ownership; and
   the server configurable to interface to an API of a key management service and enforce at least one of the plurality of policies through the key management service.

16. The cryptographic material management system of claim 11, further comprising:
   the server configurable to manage authentication for key production, key usage and key ownership, through corresponding APIs.

* * * * *